US 6,606,114 B1

(12) United States Patent
Gordon et al.

(10) Patent No.: US 6,606,114 B1
(45) Date of Patent: Aug. 12, 2003

(54) COMBINATION HEAD-PROTECTIVE HELMET AND THERMAL IMAGING APPARATUS

(75) Inventors: Kerry W. Gordon, Mendham, NJ (US); Christopher E. Coombs, Middletown, DE (US); Richard M. Peel, Gibbstown, NJ (US); Robert J. Richter, Kingwood, TX (US); Andrew J. Fordham, Sugar Hill, GA (US)

(73) Assignee: Diversified Optical Products, Inc., Salem, NH (US)

( * ) Notice: Subject to any disclaimer, the term of this patent is extended or adjusted under 35 U.S.C. 154(b) by 0 days.

(21) Appl. No.: 09/435,795

(22) Filed: Nov. 8, 1999

Related U.S. Application Data

(63) Continuation-in-part of application No. 08/042,044, filed on Mar. 31, 1993.

(51) Int. Cl.⁷ .............................. H04N 7/18; H04N 9/47; H04N 5/33
(52) U.S. Cl. .......................................... 348/64; 348/164
(58) Field of Search ......................... 359/815; 350/538; 2/414, 6; 348/64

(56) References Cited

U.S. PATENT DOCUMENTS

| | | | | | |
|---|---|---|---|---|---|
| 4,028,725 | A | * | 6/1977 | Lewis | 358/103 |
| 4,156,292 | A | * | 5/1979 | Helm | 2/6 |
| 4,449,787 | A | * | 5/1984 | Burbo | 350/538 |
| D283,268 | S | * | 4/1986 | Rebiskie et al. | D2/248 |
| 4,786,966 | A | * | 11/1988 | Hanson | 358/108 |
| 5,044,016 | A | * | 9/1991 | Coombs | 2/414 |
| 5,089,914 | A | * | 2/1992 | Prescott | 359/815 |
| 6,023,288 | A | * | 2/2000 | Coombs | 348/64 |

* cited by examiner

*Primary Examiner*—Chris Kelley
*Assistant Examiner*—Charles Parsons

(57) ABSTRACT

Combination head-protective helmet and thermal imaging apparatus including an infrared camera for producing an infrared image of a scene or object and a display system which generates a visible image of the scene or object from the infrared image; various mounting apparatus for mounting the thermal imaging apparatus to the helmet.

17 Claims, 12 Drawing Sheets

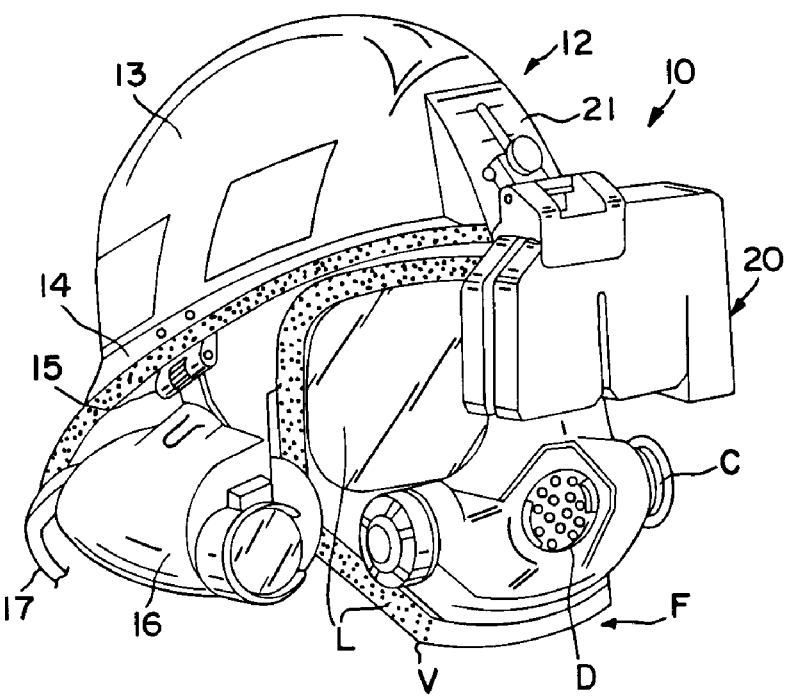
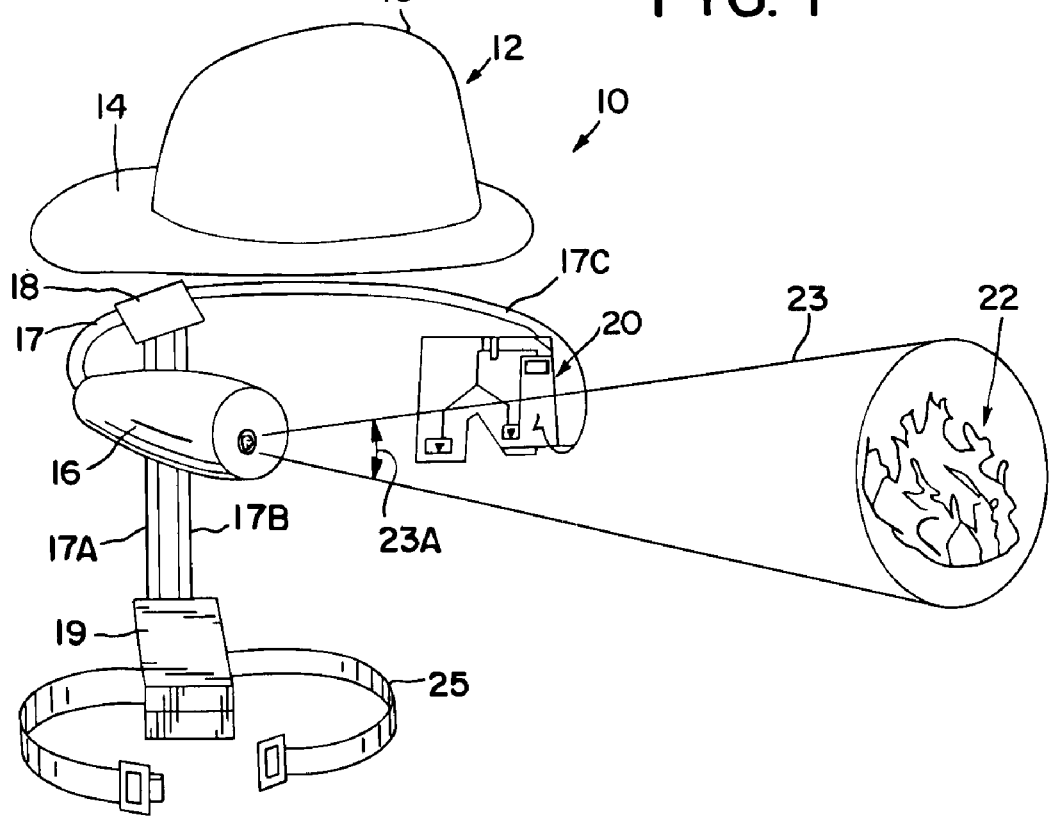

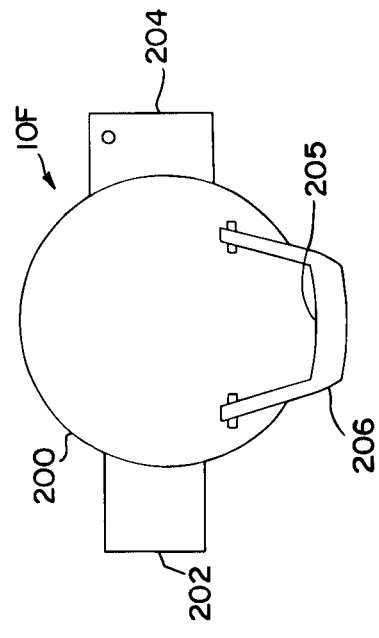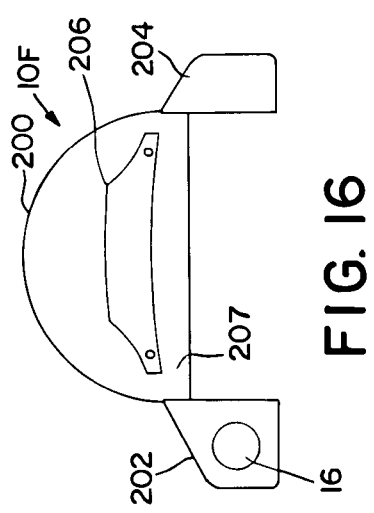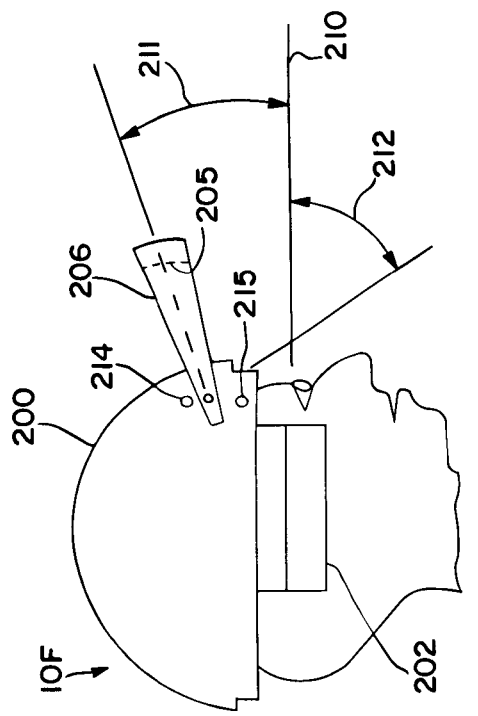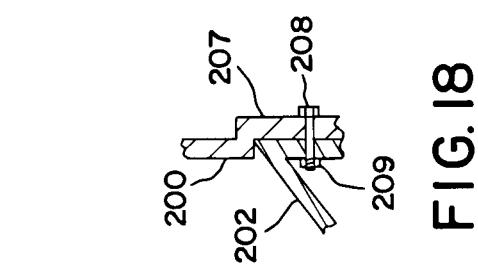

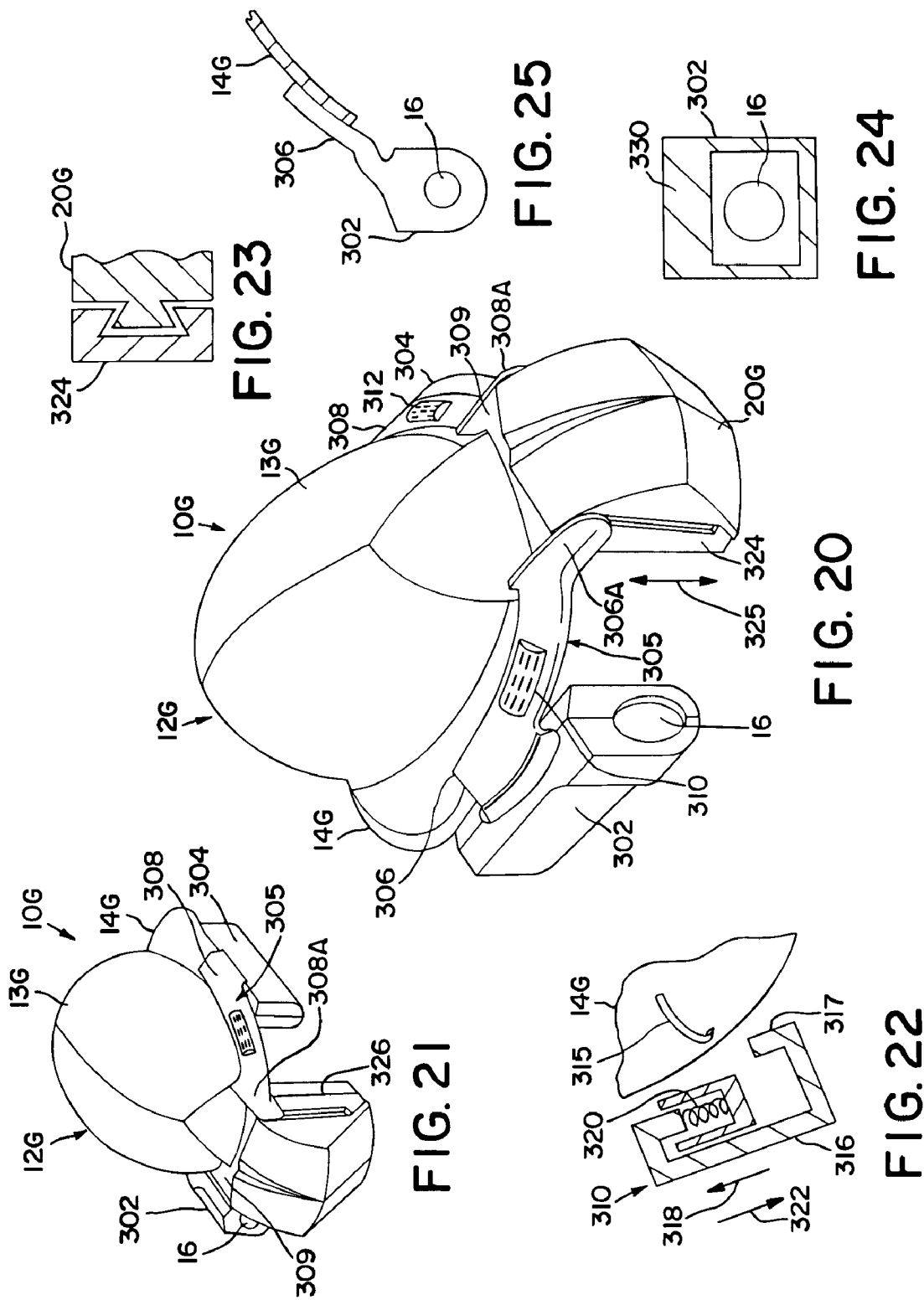

US 6,606,114 B1

COMBINATION HEAD-PROTECTIVE HELMET AND THERMAL IMAGING APPARATUS

CROSS-REFERENCE TO RELATED APPLICATION

This application is a continuation-in-part patent application of U.S. patent application Ser. No. 08/042,044, filed Mar. 31, 1993, entitled COMBINATION HEAD-PROTECTIVE. HELMET AND THERMAL IMAGING APPARATUS, and this application also is related to U.S. patent application Ser. No. 09/228,849, filed Jan. 12, 1999 and entitled COMBINATION HEAD-PROTECTIVE HELMET AND THERMAL IMAGING APPARATUS (which application is a continuation of U.S. patent application Ser. No. 08/042,004); these earlier-filed related patent applications are assigned to the same assignee as the present application.

BACKGROUND OF THE INVENTION

This invention relates to a new and improved head-protective helmet and thermal or infrared imaging apparatus. The helmet provides the wearer of the combination with head protection against falling objects in a hostile environment, such as for example a fire, and the thermal imaging apparatus provides the wearer with a thermal or infrared image in the wearer's field of view permitting the wearer to see objects radiating thermal energy in the infrared spectrum which otherwise would be obscured from the wearer's view due, for example, to dense smoke encountered in a fire; the thermal imaging apparatus also permits viewing of fire or other hot spot radiating energy in the infrared range but obscured, for example, by a wall or roof. In a preferred embodiment of the present invention, the invention relates to a new and improved fireman's helmet and thermal or infrared imaging apparatus.

Numerous head-protective helmets are known to the art, such as for example the FIREMAN'S HELMET WITH ENERGY ABSORBING LINER disclosed in U.S. Pat. No. 4,286,339 issued Sep. 1, 1981 to Peter A. Coombs inventor and the PROTECTIVE HELMET ASSEMBLY INCLUDING RELEASEABLE HEAD RETAINING ASSEMBLY disclosed in U.S. Pat. No. 5,044,016 issued Sep. 3, 1991 to Christopher E. Coombs, both patents assigned to the same assignee as the present invention. These patents are hereby incorporated by reference as if fully reproduced herein. Also, numerous thermal or infrared imaging apparatus are known to the art for providing a person with an image of objects radiating energy in the infrared range. Also known to the art are combination helmet and thermal camera arrangements such as disclosed in U.S. Pat. No. 5,089,914 issued Feb. 18, 1992 to James A. Prescott, inventor, and assigned to EEV Limited.

However, there still exists a need in the art for new and improved combination head-protective helmet and thermal imaging apparatus which is particularly useful when embodied as a combination fireman's helmet and thermal imaging apparatus wherein the thermal imaging apparatus is mounted advantageously to the fireman's helmet to reduce discomfort to the fireman and to provide the fireman with hands-free wearing of the combination thereby facilitating the fireman's ability to wear the combination while engaged in fire fighting and which combination provides the fire fighter with the thermal image of objects he cannot otherwise see with his natural eyesight, such as for example bodies of unconscious but alive fire and smoke victims present at a fire scene. There also exists a need in the fire fighting art for mounting the thermal or infrared sensor camera of such thermal imaging apparatus in a temperature protected manner so as to reduce the influence of a heated environment, such as is present at a fire scene, on the camera which is thermal sensitive.

SUMMARY OF THE INVENTION

It is the object of the present invention to satisfy the foregoing need in the art.

Combination head-protective helmet and thermal imaging apparatus satisfying the foregoing need and embodying the present invention may include a head-protective helmet, an infrared sensor camera for producing an infrared image of a scene or object and display apparatus which generates a visible image of said scene or object from the infrared image for viewing by the eyes of a person wearing the combination, and various mounting apparatus for mounting the thermal imaging apparatus to the helmet.

DESCRIPTION OF THE DRAWINGS

FIG. 1 is a perspective view of combination head-protective helmet and thermal imaging apparatus of the present invention;

FIG. 2 is a diagrammatical illustration of the combination head-protective helmet and thermal imaging apparatus of the present invention illustrating diagrammatically the taking of a thermal image;

FIG. 16 is a front elevational view of an alternate embodiment of the present invention;

FIG. 17 is a top view of FIG. 16;

FIG. 18 is a partial cross-sectional view illustrating the mounting of a housing to a head-protective helmet shell;

FIG. 19 is a side view of FIG. 16 including a partial view of the head of the wearer of the helmet and illustrating the pivotal mounting of the visual display;

FIG. 20 is a left front perspective view of a further embodiment of the present invention;

FIG. 21 is a right front perspective view of the embodiment shown in FIG. 20;

FIG. 22 is a diagrammatical illustration of the fastening of a mounting member to the brim of a head-protective helmet;

FIG. 23 is a diagrammatical cross-sectional illustration of the mounting of the visual display for vertical upward and downward movement with respect to the head-protective helmet;

FIG. 24 is a diagrammatical cross-sectional view of a housing shown in FIGS. 20 and 21;

FIG. 25 is a diagrammatical view, partially in cross-section, illustrating the structural relationship of a mounting member to the brim of a head-protective helmet;

DETAILED DESCRIPTION OF THE DRAWINGS

Figure 3:
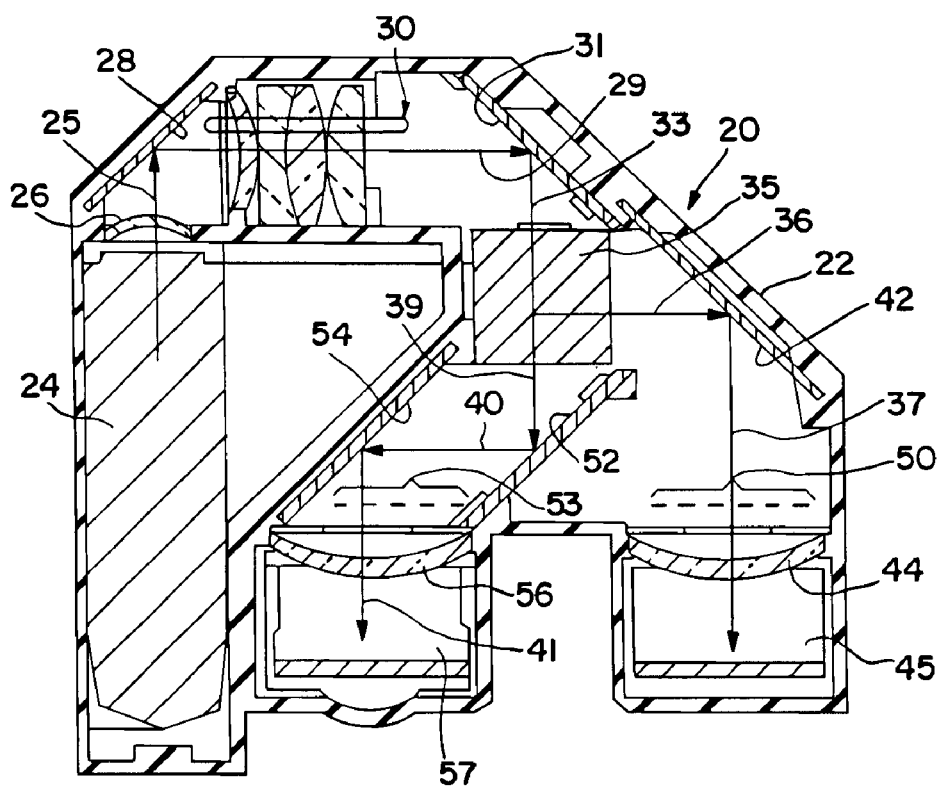
FIG. 3 is a vertical cross-sectional view taken generally through the display apparatus shown in FIG. 1 and as viewed outwardly.

Referring now to FIGS. 1 and 2, there is illustrated combination head-protective helmet and thermal imaging apparatus embodying the present invention and indicated by general numerical designation 10. In the preferred embodiment, the head protective helmet is embodied as a fireman's helmet indicated by general numerical designation 12 and including a cap 13 and an outwardly extending brim 14. Apparatus 10 further includes a thermal or infrared sensor camera 16 mounted to and residing generally under the brim 14 by a pivotable mounting member 15 and which camera is connected by a suitable cable 17 to a junction box 18, FIG. 2, and therefrom over cable 17A to a suitable combination signal processing and battery power supply 19 which supplies power the apparatus 10 and converts the thermal image signals from the camera 16 to television or TV signals in a manner known to the art; combination signal processing and power supply 19 may be mounted suitably on a fireman's belt 25. The TV signals are transmitted by a suitable cable 17B to the junction box 18 and therefrom over a suitable cable 17C to a helmet mounted display apparatus indicated by general numerical designation 20. Display apparatus 20 is mounted to the helmet cap 13 by a mounting member 21 for movement with respect to the helmet 12 to permit the display apparatus 20 to be moved out of the field of view of the wearer of the combination apparatus 10 upon the wearer desiring to use his natural eyesight for viewing; such movable mounting of the display apparatus is described in detail below. As will be further understood from FIG. 1, and by further reference to FIG. 2, the thermal or infrared sensor camera 16 makes a thermal image, for example, of a fire scene radiating infrared energy and indicated by general numerical designation 22 in FIG. 2, and which scene may be from about six (6) feet, or about two (2) meters, to infinity from the sensor camera 16 and which thermal image, in the preferred embodiment, is subtended in a 36° field angle of view of the thermal sensor camera 16; the field angle of view is indicated by numerical designation 23 in FIG. 2 and the field angle is indicated by the curved arrow 23A. Similarly, the scene 22 could be that of an alive but unconscious fire or smoke victim radiating infrared energy. Mounting of the camera 16 generally under the brim 14 protects the camera from being struck by falling objects striking the top portions of the helmet cap 13 and brim 14.

As will be understood from FIG. 1, the display apparatus 20 of the present invention may be used in conjunction with a facepiece indicated by general numerical designation F of the type known to the art and which include a lens L, a breathing gas inlet connector C, speech diaphragm D and an exhalation or outlet valve V. It will be further understood that the mounting member 15 mounts the thermal sensor camera 16 in a position generally underneath the brim 14 such that the camera 18 is bathed and thereby cooled by exhalation gas or air exiting the exhalation valve V. Such cooling enhances the operation of the thermal or infrared sensor camera 18 particularly when it is present in a heated environment such as may be encountered at a fire scene.

Figure 5:
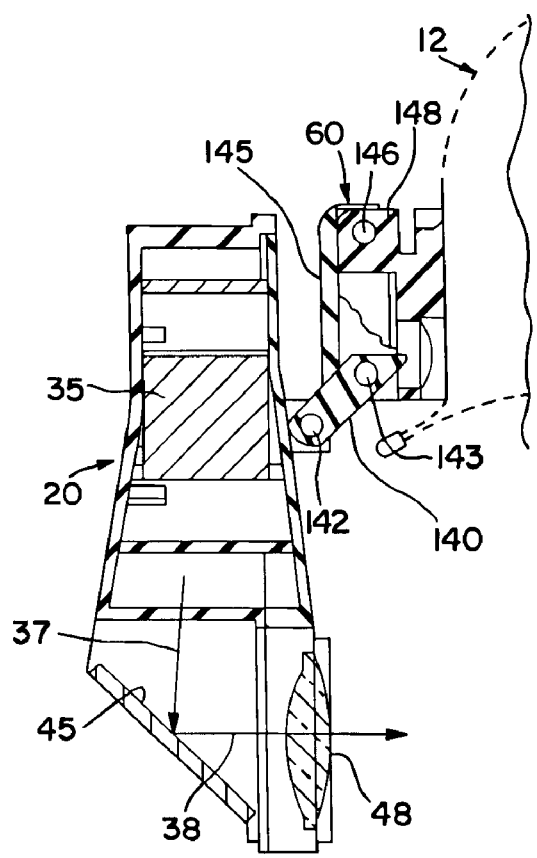
FIG. 5 is a cross-sectional view taken generally along the irregular section line S/L in FIG. 4 in the direction of the arrows.
Figure 6:
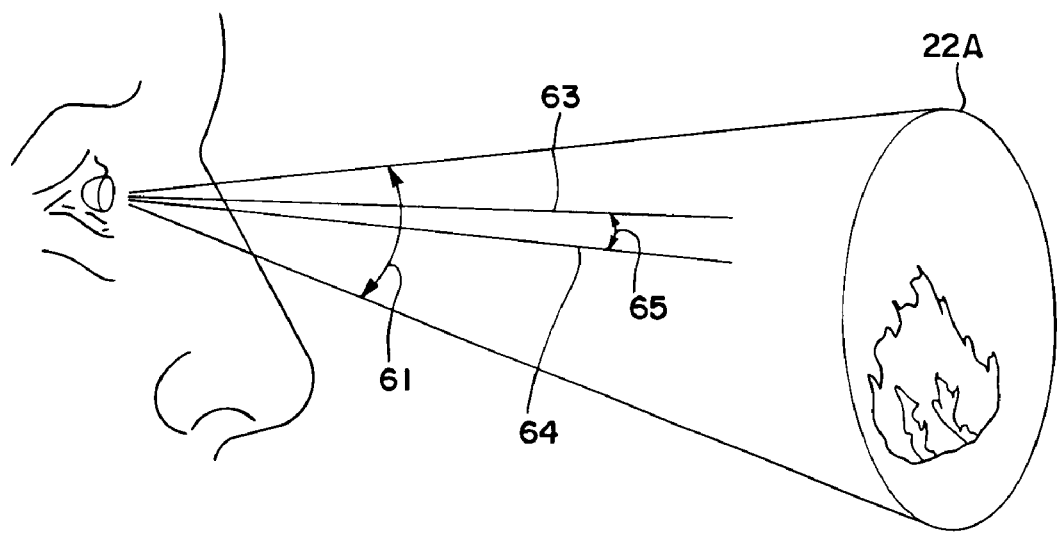
FIG. 6 is a diagrammatical illustration of the field of view angle of the virtual images produced by the present invention.

Referring now to FIGS. 3 and 5, and first to FIG. 3, it will be understood that the display apparatus 20 may include a suitably shaped housing 22 in which are suitably mounted a CRT or television tube 24 and the other optical elements shown in FIG. 3 and described below. The television tube 24 receives television signals from the combination signal processing and power supply 19 and produces a TV image of the scene 22 carried by light rays emanating from the TV tube 24. The light rays are provided with a ray path indicated by arrows 25, 29 and 33 extending from the television tube 24 to a suitable beam splitter 35, such light rays pass through a suitable field flattener lens 26, strike a suitable inclined mirror 28 and are reflected through a suitable relay lens group or grouping of the type known to the art and indicated by general numerical designation 30. Thereafter the light rays strike the inclined mirror 31 and are reflected into the beam splitter 35. The beam splitter 35 splits the light rays into two ray paths, one ray path indicated by arrows 36 and 37 in FIG. 3 and arrows 37 and 38 in FIG. 5 and being for the right eye of the wearer of the combination apparatus 10 of the present invention, and the other ray path indicated by arrows 39, 40 and 41 in FIG. 3 and being for the left eye of the wearer of the combination apparatus 10 of the present invention. The split light rays provided with the ray path indicated by arrow 36 in FIG. 3 strike a suitable inclined mirror 42 and are reflected as indicated by the arrow 37 through a suitable field lens 44 to a suitable mirror 45, FIGS. 3 and 5, where they are reflected to pass through a suitable aspheric lens 48, FIG. 5, which functions as an eyepiece for the right eye of the wearer of the combination apparatus 10 of the present invention. The field flattener lens 26, relay lens group 30, and the beam splitter 35 combine optically to produce an intermediate real image of the scene 22 in advance of the field lens 44 indicated by the dashed line and numerical designation 50 in FIG. 3. This intermediate real image 50 is transmitted through the field lens 44 to the aspheric lens 48, FIG. 5, which converts the intermediate real image 50 to a virtual image of the scene 22 in FIG. 2 which virtual image is viewed by the right eye of the wearer of the apparatus 10 as shown in FIG. 6 and which virtual image is indicated in FIG. 6 by numerical designation 22A; such virtual image will appear to float in front of the right eye of the wearer of the combination apparatus 10 of the present invention at a distance from about 3 to about 10 feet and will subtend a virtual image field angle of view of 36° in the preferred embodiment of the present invention. The virtual image field angle of view is indicated by curved arrow 61 in FIG. 6. Similarly, FIG. 3, the split light rays from the beam splitter 35 are reflected by the mirrors 52 and 54 and pass through a suitable field lens 56, strike a suitable mirror 57, and pass through a suitable aspheric lens, not shown, but the same as aspheric lens 48 shown in FIG. 5, to the left eye of the wearer of the apparatus 10; the field flattener lens 26, relay lens group 30 and beam splitter 35 combine, optically, to produce an intermediate real image of the scene 22 in advance of the field lens 56 and indicated by the dashed line identified by numerical designation 52. This intermediate real image is transmitted to the aspheric lens (not shown) which converts the intermediate real image 52 into a virtual image (not shown) of the scene 22 which is viewed by the left eye of the wearer of the apparatus 10; such virtual image will appear to float in front of the left eye of the wearer of the combination apparatus 10 at a distance of about 3 to about 10 feet and will subtend a virtual image field angle of view of 36° in the preferred embodiment of the present invention which virtual image is not shown in the drawings but will be understood to be the same as virtual image 22A in FIG. 6. It will be understood that such aspheric lens, not shown, functions as an eyepiece for the left eye of the wearer of the combination 10. The relay lens group 30 also performs any needed optical aberration correction.

It will be understood in accordance with the present invention that the field flattener lens 26 and the relay lens grouping 30 are located in advance of or prior to the beam splitter 35 to prevent magnification mismatch between the left and right eye paths. It will be further noted and understood that the real field angle of view, 23A of FIG. 2, of the thermal sensor camera 16 and the virtual image field angle 61 in FIG. 6 are equal whereby the magnification ratio of these field angles is unity to provide the wearer of the combination apparatus 10 of the present invention with scene imagery the same size as the scene would be viewed in the real world. This permits the wearer of the combination 10 of the present invention to obtain accurate depth perception by seeing objects at their real relative size.

Referring again to FIG. 6, a further feature of the combination apparatus 10 of the present invention is illustrated. Line 63 indicates the horizontal and line 64 indicates the center line of the field of view of the display apparatus 20, FIG. 3, of the present invention. It will be understood that the center line of the field of view of the display apparatus of the present invention is displaced at a downward angle with respect to the horizontal as indicated by the curved arrow 65. In the preferred embodiment of the present invention, this downward displacement angle was between 0° to 10°. This downward angle or displacement of the center line of the field of view of the display apparatus of the present invention has been found to present a more comfortable line of sight to a viewer or wearer of the combination apparatus 10 of the present invention than would be presented were the center line of the field of view of the display apparatus of the present invention to be coincident, or substantially coincident, with the horizontal.

Figure 7:
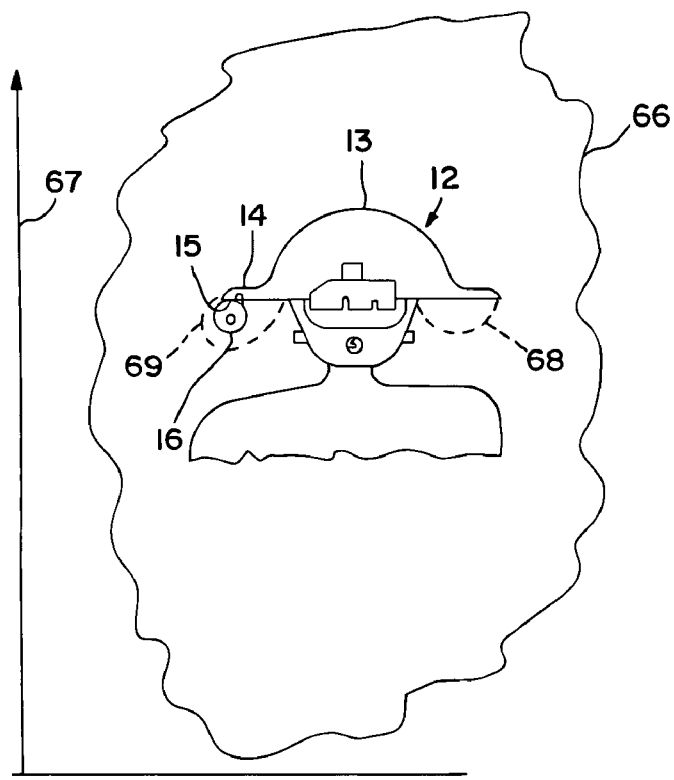
FIG. 7 is a diagrammatical illustration of a heated environment having stratified heat which increases vertically.

As known to those skilled in the fire fighting art and as known to those skilled in the fire helmet art, and referring to FIG. 7, upon a fire helmet 12 being present in a heated environment, indicated by irregular outline 66, the fire helmet 12, and a person wearing the fire helmet, experience stratified heat in that, as is known, the heat in the heated environment 66 increases vertically, as indicated by the arrow 67 and, as further known to those skilled in the art, an envelope of reduced heat is present underneath the helmet brim 14 which envelope is indicated diagrammatically by the dashed semi-circular lines 68 and 69. It will be further understood that in accordance with the present invention the mounting member 15, better seen in FIG. 1, mounts the infrared sensor camera 16 underneath the helmet brim 14 to cause the camera 16 to reside generally in said envelope of reduced heat, 68 and 69, to reduce the influence of the heated environment 66 on the camera 16.

Figure 8:
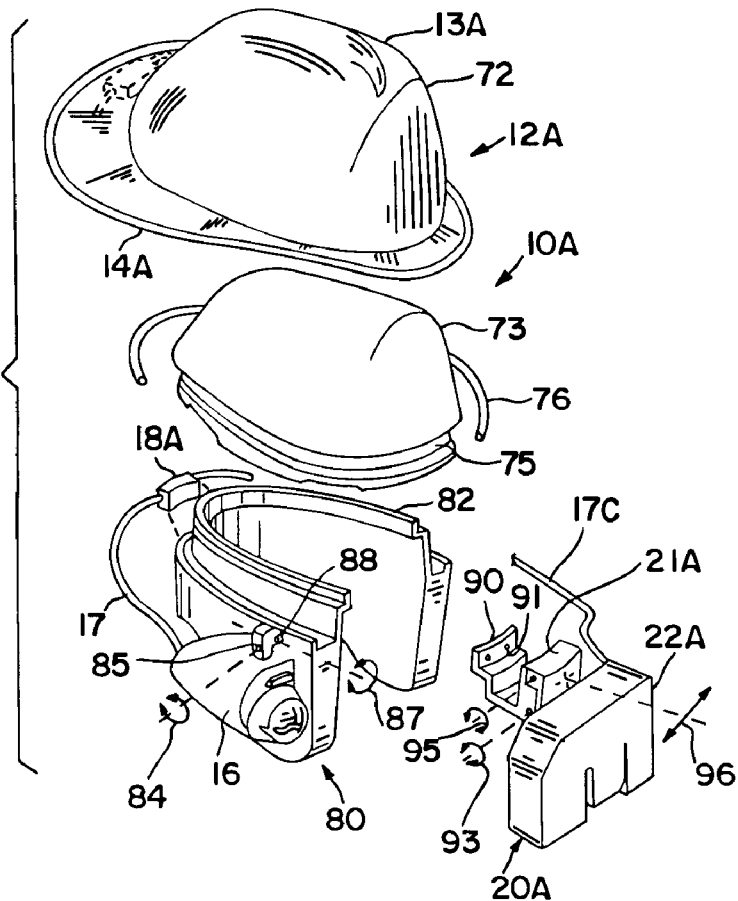
FIG. 8 is an exploded view of an alternate embodiment of the present invention including an inner deformable cap and a shroud.

An alternate embodiment of the combination head-protective helmet and thermal imaging apparatus of the present invention is illustrated in FIG. 8 and indicated by general numerical designation 10A. In this embodiment, the fire helmet indicated by general numerical designation 12A includes an outer hard shell 72 including a cap 13A and brim 14A and an inner deformable cap 73 mounted removably to the outer hard shell 72 in the manner taught in the above-noted incorporated U.S. Pat. Nos. 4,286,339 and 5,044,016. Such mounting, as is taught in such patents, is a safety feature which permits the outer shell 72 to separate from the inner deformable cap 73 such as, for example, on a fireman wearing the helmet and falling through a hole wherein the brim 14A catches upon the material surrounding the hole but the fireman's head is not caught in the outer shell, because the inner deformable cap 73 separates from the outer shell permitting the fireman to fall through the hole without the possibility of hanging; although not shown in FIG. 8, but shown in the incorporated patents, a head strap is mounted to the inner deformable cap 73 which includes a chin strap fastened around the fireman's chin. The inner deformable cap 73 is provided with a groove 75 in which is received a resilient member 76 to which the above-noted, but not shown, straps or cradle of straps are mounted. Also shown in FIG. 8 is a shroud, indicated by general numerical designation 80 and which, as known to the art, protects at least the ears of the wearer of the helmet 12A from heat and flame. The shroud 80 is provided with an upwardly extending member 82 which resides in the groove 75 and is wedged between the resilient member 76 and the inner deformable cap 73 to thereby mount the shroud 80 removably to the inner deformable cap 73. In this embodiment of the present invention, the thermal or infrared sensor camera 16 is mounted to the shroud so as to reside generally underneath the helmet brim 14A whereby the camera is protected from falling objects striking the top portions of the helmet cap 13A and brim 14A and also to cause the camera to reside within the envelope of reduced heat indicated in FIG. 7 and described above. It will be noted that in this embodiment the camera 16 is mounted for vertical rotation as indicated by the double headed arrow 84 by being mounted on a pin 85 and the camera is also mounted for pivotal movement in the horizontal as indicated by double headed arrow 87 by being mounted pivotally on pin 88. In this embodiment, it will be understood that the junction box 18, FIG. 2, may be mounted to the rear portion of the shroud 80 by suitable means not shown. The display apparatus 20A of this embodiment is mounted removably to the inner deformable cap 73 by being provided with an outwardly and upwardly extending member 90 providing a groove 91 which receives the resilient member 76 to wedge the member 90 between the resilient member and the cap 73 with the member 90 residing in the groove 75. The housing 22A is mounted pivotally to the mounting member 21A for first upward pivoting or tilting movement as indicated by the double headed arrow 93 to tilt the display apparatus 20A upwardly and away from the lens L, FIG. 1, to permit the wearer of the combination 10 to see through the lens L with his natural eyesight. The display apparatus 20 is provided with further upward pivoting movement as indicated by the double headed arrow 95 to permit the wearer of the combination 10 (FIG. 1) to further tilt the display apparatus 20A upwardly into a stowed position; these pivoting movements of the display apparatus 20A are taught in detail below. In addition, as indicated by the double headed arrow 96 in FIG. 8, the display apparatus 20A may be mounted to the mounting member 21A, for reciprocal movement leftwardly and rightwardly with respect to the eyes of the wearer of the combination apparatus 10, FIG. 1, to align the eyepieces 48 with the eyes of the wearer of the combination apparatus. This lateral reciprocal movement is also described in detail below.

Figure 9:
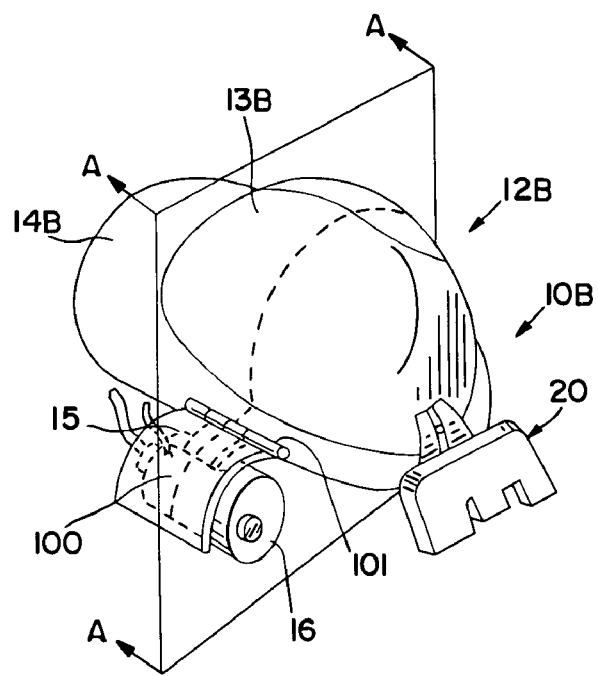
FIG. 9 is a perspective view of a further alternate embodiment of the present invention.
Figure 9A:
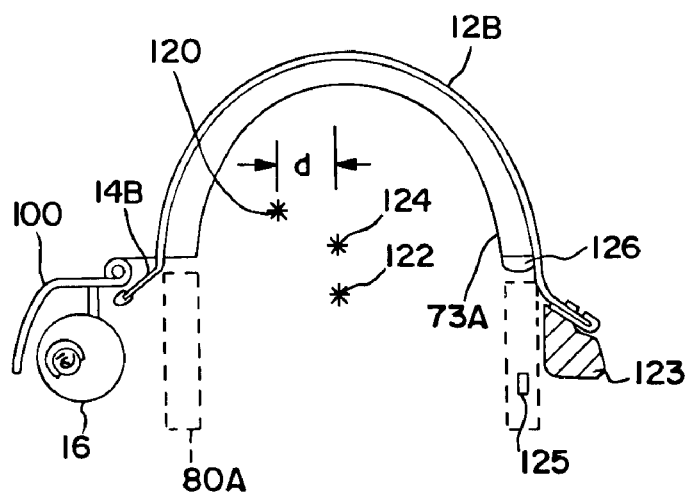
FIGS. 9A–9D are a series of views indicating the counter balance feature of the present invention.

A further alternate embodiment of the combination head-protective helmet and thermal imaging apparatus of the present invention is illustrated in FIG. 9 and indicated by general numerical designation 10B. In this embodiment the thermal or infrared sensor camera 16 may be mounted underneath the brim 14B of the helmet 12B as shown in FIG. 1 and described above and the display apparatus 20 may also be mounted to the helmet 12B as shown in FIG. 1 and described above; alternatively, it will be understood that the camera 16 and display apparatus 20 may be mounted removably to an inner deformable cap, such as inner deformable cap 73 shown in FIG. 8, and in the manner described above, although such inner deformable cap is not shown in FIG. 9. In this embodiment, an outwardly and downwardly curved protective shield 100 is mounted pivotally to the helmet brim 14B by a suitable hinge 101 to provide the camera 16 with additional protection from falling objects striking the top of the helmet 12B and brim 14B and to provide the thermal camera with additional shielding upon the combination 10B residing in a heated environment such as the environment 66 indicated in FIG. 7. The protective shield 15 may be made of a suitable heat resistant plastic of the type known to the art. Further, alternatively, as shown in FIG. 9A, the infrared sensor camera 16 may be mounted to and under the protective shield 100 by a suitable mounting member 100A. The outer surface of the shield 100 extends the plane of protection provided by the outer surface of the helmet 12 particularly over the camera 6.

Figure 9B:
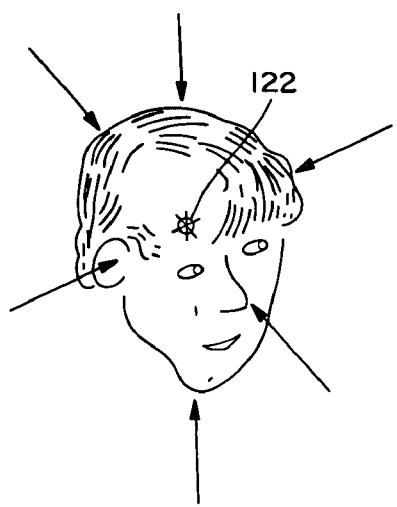
Figure 9C:
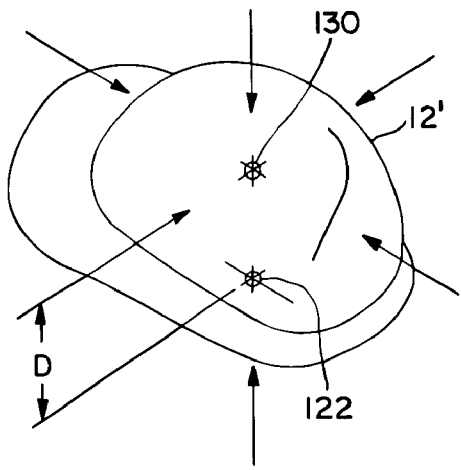
Figure 9D:
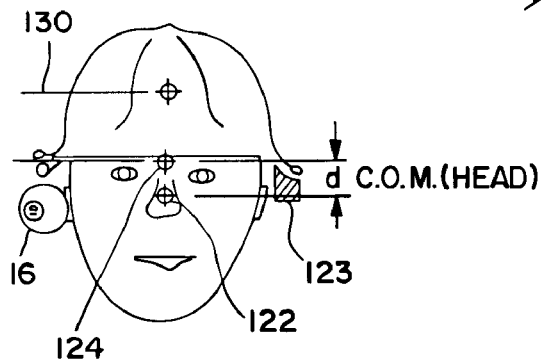

It will be understood by reference to FIG. 9A that upon the thermal camera 16 being mounted to the helmet brim 14 and outwardly of the helmet 12B the helmet and camera will have a combined center of mass 120 which will be offset by the distance d from the center of mass 122 of the head of the wearer of the helmet 12B. This distance d, due primarily to gravity acting on the camera 16, will produce counter clockwise torque as viewed in FIG. 9A causing discomfort to the wearer of the helmet 12B. This counter clockwise torque can be offset by the present invention by mounting a counter balance 123 to the helmet 128 such, as for example, to the helmet brim 14B substantially opposite to, and substantially equal in weight to, the camera 16. Such counter balance will produce a clockwise torque, as viewed in FIG. 9A, substantially cancelling the counter clockwise torque produced by the camera 16 effectively moving the combined center of mass of the helmet 12B, camera 16 and counterbalance rightwardly and downwardly to the point 124. This effectively reduces d to zero and places the center of mass 123 over the center of mass 122 which will substantially eliminate the aforementioned discomfort and fatigue otherwise caused to the head of the wearer of the helmet 12B without the counter balance 123. Alternatively, counter balance 123 may be mounted internally of a shroud 80A, shown in dashed outline in FIG. 9A but which shroud 80A may be substantially the same as the shroud 80 shown in FIG. 8. Such mounting of the counter balance is shown in dashed outline in FIG. 9A and indicated by numerical designation 125. Alternatively, upon the helmet 12B of FIG. 9A being provided with the inner deformable cap 73A, which may be the same as inner deformable cap 73 shown in FIG. 8, the counter balance may be mounted internally of the cap 73A as shown in the dashed outline indicated by numerical designation 126. For a further understanding of the counter balance feature shown in FIG. 9A and described above, reference may be made to FIGS. 9B, 9C and 9D wherein the center of mass 122 of the head of a person to wear the helmet is illustrated in perspective and wherein in FIG. 9C the center of mass 130 of the helmet 12', without the thermal camera or counter balance mounted thereto, is indicated by numerical designation 130 which, as will be noted from FIG. 9C, is displaced upwardly of the center of mass 122 of the head of the person to wear the helmet by the distance D. As will be further understood from FIG. 9D, the counter balance 123 in combination with the camera 16 effectively reduces the distance D, FIG. 9C, to the distance d which effectively moves the centers of mass closer together thereby substantially reducing fatigue to the head of the wearer of the helmet noted above. It will be understood that the centers of mass 122 and 130 can be made effectively coincident by adding a counter balance to the side of the helmet on which the camera 16 is mounted and additional counter balance to the rightward side of the helmet which will effectively reduce the distance d to 0 thereby making the centers of mass 122 and 123 substantially coincident and thereby substantially eliminating the above-noted fatigue or discomfort to the wearer of the helmet.

Figure 10:
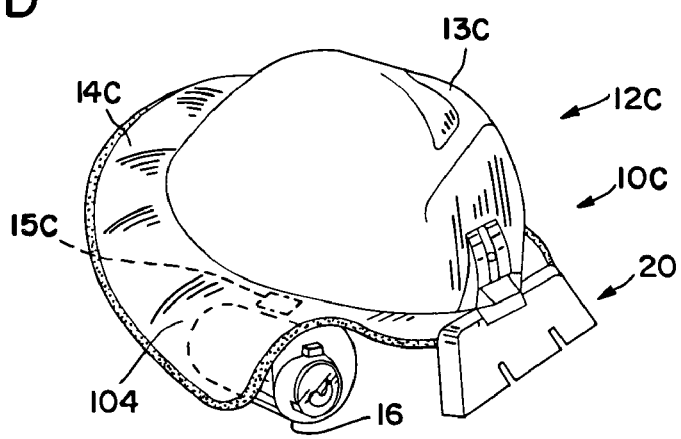
FIG. 10 is a perspective view illustrating a further embodiment of the present invention.

A further alternate embodiment of combination head-protective helmet and thermal imaging apparatus of the present invention is illustrated in FIG. 10 and indicated by general numerical designation 10C. In this embodiment the helmet brim 14C is provided with an integrally formed outwardly and downwardly extending portion 104 to further protect the thermal or infrared sensor camera 16 from falling objects striking the top portion of the helmet cap 13C and the brim 14C and to further shield the camera 16 from heat upon the combination 10C residing in a heated environment such as heated environment 66 shown in FIG. 7. It will be further understood that the outwardly and downwardly extending portion 104 of the helmet brim 14C also further places the camera 16 in an envelope of reduced heat underneath the helmet brim 14C and which envelope is indicated in FIG. 7 by dashed lines 68 and 69 and described above. The camera 16 may be mounted suitably to the helmet brim 14C such as for example by the mounting member 15 shown in FIG. 1 and indicated by the dashed rectangle 15C in FIG. 10.

Figure 11:
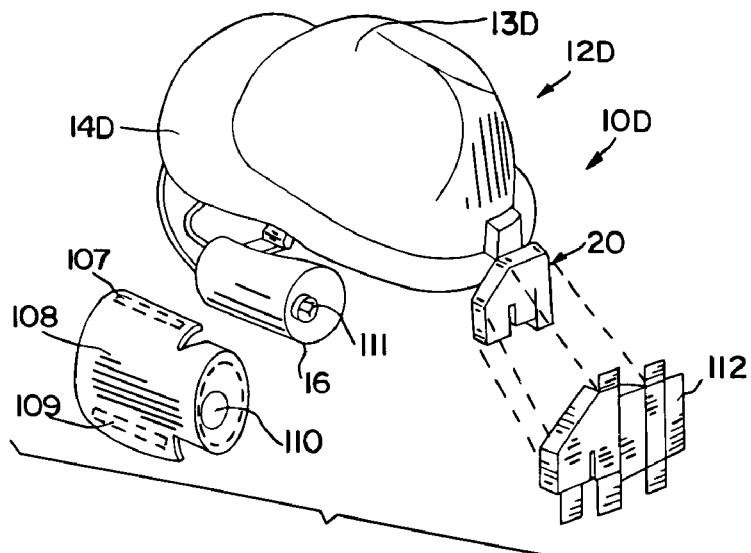
FIG. 11 is a perspective exploded view illustrating a still further embodiment of the present invention.

FIG. 11 illustrates a further alternate embodiment of the head-protective element and thermal imaging apparatus of the present invention which alternate embodiment is indicated by general numerical designation 10D. It will be understood that the thermal or infrared sensor camera 16 and display apparatus 20 may be mounted to the helmet 12D as taught in the earlier described embodiments and as shown in the earlier described FIGS., and in this embodiment the combination 10D further includes a first fire and heat protective insulated jacket 108 slightly larger than and complementary in shape to the shape of the camera 16 and for being mounted thereover and secured thereto such as, for example, by Velcro strips 107 and 109 shown in FIG. 11 in dashed outline; the jacket 108 is provided with a suitable opening or aperture 110 to expose the lens 111 of the camera 16. Similarly, a second fire and heat protective insulated jacket 112 slightly larger and complementary in shape to the display apparatus 20 is provided for fitting over and being secured to the display apparatus 20 such as, for example, by suitable Velcro strips, not shown.

Figure 12:
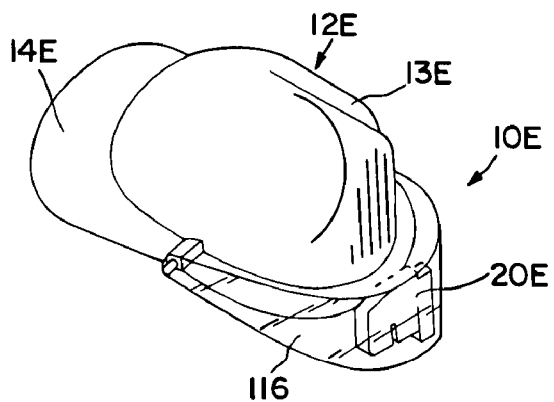
FIG. 12 is a perspective view illustrating a still further embodiment of the present invention.
Figure 13:
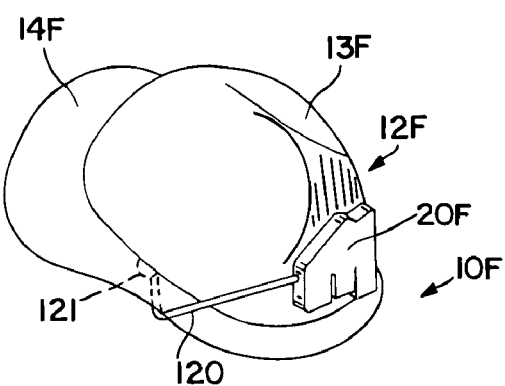
FIG. 13 is a perspective view illustrating a further embodiment of the present invention.

FIGS. 12 and 13 show other alternate embodiments of the present invention wherein as illustrated in FIG. 12 the display apparatus 20E may be suitably mounted to a transparent visor or face shield mounted pivotally to the cap 13E of the helmet 12E in the manner known to the art; the display apparatus 20E may be suitably mounted to the visor or face shield 116 such as, for example, by a suitable plastic or by suitable threaded fasteners. In FIG. 13, the display apparatus 12F may be suitably mounted to an elastic or adjustable band or strap 120 which may be suitably mounted to the underneath portion of the brim 14F by a suitable fastener 121 indicated in dashed outline; it will be understood that another strap and fastener are on the other side of the display apparatus F and are mounted in the same manner although such are not shown. In the embodiments of the present invention shown in FIGS. 12 and 13, the thermal or infrared sensor camera is not illustrated for clarity and simplicity of presentation. It will be understood that the pivotally mounted face shield 116 in the combination embodiment 10E permits the display apparatus 10E to be pivoted downwardly with the face shield 116 to present the display apparatus in front of the eyes of the wearer of the helmet 13E and in the embodiment 10F of FIG. 13 the elastic or adjustable bands or straps permit the display apparatus 28 to be moved upwardly over the helmet 12F as shown in FIG. 13 and permit the display apparatus to be moved downwardly in front of the eyes of the wearer of the helmet 12F.

Referring again to FIG. 5, it will be generally understood that the display apparatus 20 may be mounted pivotally to the helmet 12 for movement into a plurality of in use positions relative to the helmet and into a stowed position relative to the helmet. The mounting member 60 includes a dual pivot mounting arm 140 which is connected pivotally to the display apparatus 20 by pivot pin 142 and which is also mounted pivotally by pivot pin 143 to an in-use position lock arm 145. Arm 145 is mounted pivotally by pin 146 to a mounting base 148 which is mounted to the helmet 12 by suitable mounting means, not shown, such as suitable screws or bolts. The in-use position lock arm 145 is rotated about the pivot pin 146 only to move the display apparatus 20 into the stowed position.

Figure 14:
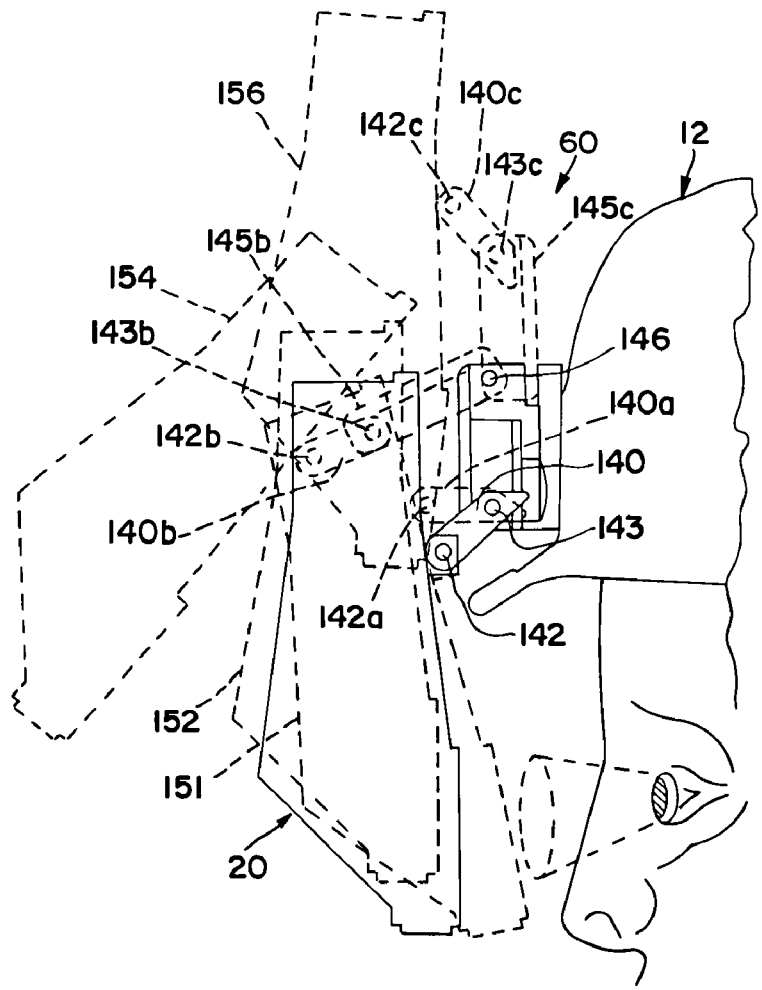
FIG. 14 is a multiple view drawing illustrating the operation of the mounting member of the present invention for mounting the display apparatus into a plurality of in-use positions and into an ultimate stowed position.

Referring now to FIG. 14, the display apparatus 20 shown in solid outline is shown in one of its in-use positions for viewing by the eye of the wearer of the helmet 12 as indicated diagrammatically in FIG. 14. Other in-use positions of the display apparatus 20 are shown in dashed outline and indicated by numerical designations 151 and 152. In-use position 151 demonstrates the toe-in capability of the mounting member 60 wherein the display apparatus 20 pivots inwardly about the pivot pin 142. Dashed outline in-use position 152 demonstrates the raising and lowering capability of the mounting member 60 wherein the display apparatus 20 pivots both about the pivot pin 142 and 143 with the pivot pin 142 pivoting into the dashed outline position 142a and with dual pivot mounting arm 140 occupying the dashed outline position 140a; the dashed outline positions 151 and 152 are representative of a plurality, substantially infinite number, of in-use viewing position, that can be obtained by the mounting member 60 for the display apparatus 20. The dashed outline indicated by numerical designation 154 demonstrates a transition position of a display apparatus 20 and is indicative of the routing of the display apparatus 120 into its ultimate stowed position shown in dashed outline and indicated by numerical designation 156. It will be understood that upon the display apparatus 120 being routed into its ultimate position 156 the display apparatus 120 rotates about, all three of the pivot pins 142, 143 and 146 with the pivot pins 142 and 143 occupying the dashed outline positions 142b and with the pivot pin 143 occupying the dashed outline position indicated by numerical designation 143b and it will be understood that in the transition position indicated by numerical designation 154 the dual pivot mounting arm 140 occupies the dashed outline position 140b and the in-use position lock arm 145 occupies the dashed outline position indicated by numerical designation 145b. Upon the display apparatus 20 being pivoted further upwardly into its ultimate stowed position indicated in dashed outline by numerical designation 156 it will be understood that the pivot pin 142 occupies the dashed line position indicated by numerical designation 142c, the pivot pin 143 occupies the dashed outline position indicated by numerical designation 143c, the dual pivot mounting arm 140 occupies the dashed outline position 140c and the in-use position lock arm 145 occupies the dashed outline position 145c.

Figure 15:
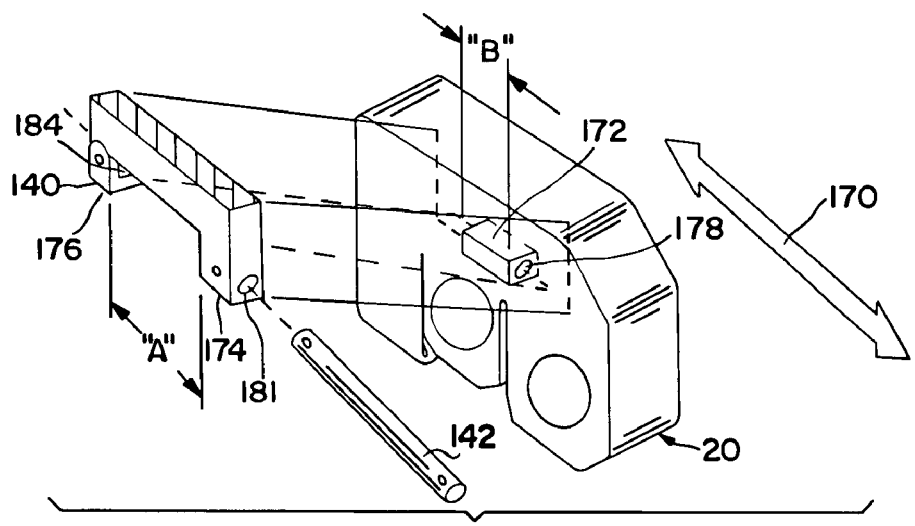
FIG. 15 is an exploded diagrammatical view in perspective illustrating the manner in which the display apparatus of the present invention may be mounted for reciprocal leftward and rightward movement for adjustment to the eyes of the wearer of the combination head-protective helmet and thermal imaging apparatus of the present invention.
Figure 27:
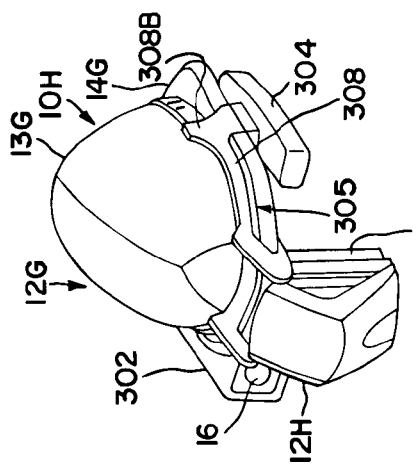
FIG. 27 is a right front perspective view of the embodiment shown in FIG. 26.
Figure 26:
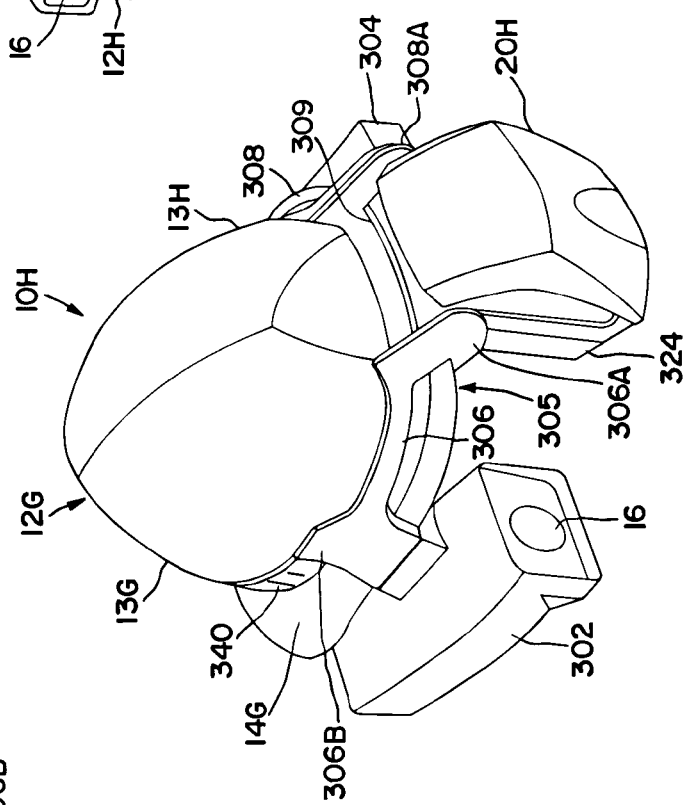
FIG. 26 is a left front perspective view of a further embodiment of the present invention.

FIG. 15 illustrates the manner in which the display apparatus 20 is mounted for reciprocal rightward and leftward movement, as indicated by the double headed arrow 170 to permit the display apparatus 20 be adjusted horizontally across the face of the wearer of the helmet, e.g. helmet 12 of FIG. 1, to accommodate for abnormalities wherein the eyes of the head of the wearer of the helmet may not be centered symmetrically with relation to the head of the wearer of the helmet. It will be understood that the dual pivot mounting arm 140 and the pivot pin 142 shown in FIG. 15 are the same as the correspondingly numbered elements shown in FIGS. 5 and 14. The display apparatus 20 is provided with an outwardly extending member 172 which may be formed integrally therewith or formed separately and suitably secured thereto. It will be noted that the member 172 has a width B which is less than the width A of the open space extending between the downwardly extending portions 174 and 176 of the dual pivot mounting arm 140. It will be further understood that the member 172 is provided with a cylindrical hole or passageway 178 slightly larger in diameter than the pivot pin 142. The pivot pin 142 extends through the hole or cylindrical passageway 181 formed in the downwardly extending member 174, through the hole or passageway 178 formed in the member 172, and through the hole or cylindrical passageway 184 formed in the downwardly extending portion 146 of the arm 140. This mounts the display apparatus 20 pivotally to the mounting pin 142, as described above, and also mounts the display apparatus 20 for the reciprocal rightward and leftward movement in the space between the downwardly extending members 174 and 176 as indicated by the double headed arrow 170. It will be understood that the reciprocal rightward and leftward movement indicated by the arrow 170 may be provided to the display apparatus 20 by other than the pivot pin 142 and may be, for example, provided along the pivot pins 143 and 146 shown in FIGS. 5 and 14.

Figure 4:
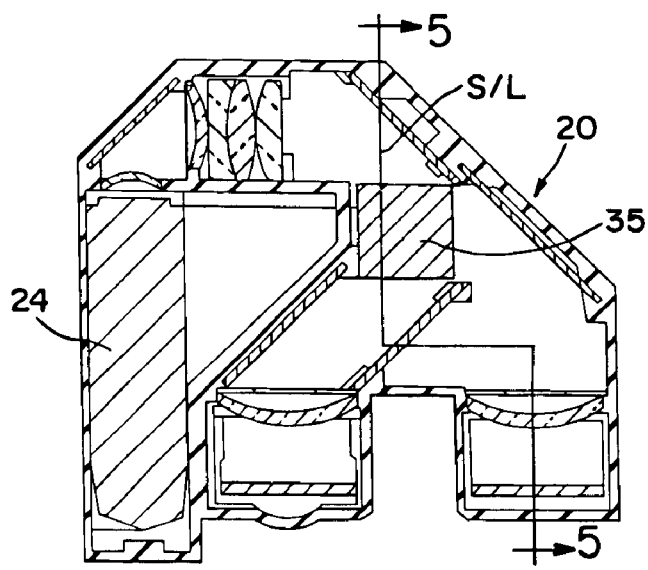
FIG. 4 is a reduced view of FIG. 3 and including the irregular section line S/L.

A further alternate embodiment of the combination head-protective helmet and thermal imaging apparatus of the present invention is illustrated in FIGS. 16–19 and is indicated by general numerical designation 10F. Combination 10F may include a generally semi-spherical hard or outer shell 200 which may have mounted internally thereof, but not shown, a non-resilient foam liner and a cradle of a plurality of web straps for supporting the head of the wearer of the helmet and which may be, for example, the foam liner 26 and cradle 28 of the plurality of web straps 30 shown in FIGS. 2 and 4 of U.S. Pat. No. 5,044,016 incorporated hereinabove. The outer shell may be made of a hard plastic such as a suitable high temperature thermoset which may be filled with glass or other fibers for increased strength.

Combination 10F may further include a housing 202, a housing 204, and a pivotally mounted display 206. The shell 200 includes a generally circular lower portion 207, note particularly FIGS. 16 and 18, to which the housings 202 and 204 are mounted generally opposite each other as shown in FIGS. 16 and 17; the shell lower portion 207 may be a generally elongated circular lower portion elongated perpendicularly with respect to the housings 202 and 204. An infrared sensor camera 16, such as the infrared sensor camera shown in FIGS. 1 and 2 described above, is mounted suitably in the housing 204 and combination signal processing and battery supply, such as combination processing and battery supply 19 shown in FIG. 2 and described above, are suitably mounted in the housing 204. The infrared imaging sensor 16 and the combination signal processing and battery supply may be suitably interconnected, such as for example, by cables such as cables 17A and 17B shown in FIG. 2 and described above, or other suitable conductive means for transmitting thermal image signals from the infrared sensor camera 16 to the combination signal processing and battery supply, such as optical fibers and the like.

Housing 202 and 204 may be made of a suitable plastic, such as for example the same thermoset of which the shell 200 may be made, and the housing 202 and 204 may be mounted to the lower portion 207 of the shell 200 by as suitable adhesive of the type known to the art for bonding or adhering plastic members. Alternatively, as illustrated in FIG. 18, the housing 202 may be mounted to the lower portion 207 of the shell 200 by a suitable threaded bolt 208 and nut 209 with the bolt 208 extending through aligned holes formed respectively in the lower shell portion 207 and the housing 202, alternatively the housings 202 and 204 may be mounted to the shell lower portion 207 by suitable clamps (not shown). The housing 204 may be mounted to the lower shell portion 207 in the same manner as housing 202.

The display 206 may be a display such as the display 20 shown in FIG. 2 and described above or may be another suitable device or screen for displaying visual images such as a liquid crystal display and the like indicated diagrammatically in FIGS. 16 and 19 by numerical designation 205. The display 206 may be interconnected to the combination signal processing and battery supply mounted in the housing 204 such as by the cable 17C shown in FIG. 2 and described above or by other suitable electrical interconnecting means such as optical fibers and the like.

As illustrated in FIG. 19, the display 206 is mounted suitably pivotally to the shell 200 for pivotal or arcuate movement upwardly and downwardly as indicated by the respective curved arrows 21 and 212. As illustrated in FIG. 19, a person wearing the combination 10F will have a horizontal sight line indicated by the line 210. The upward pivotal movement of the display 206 with respect to the horizontal sight line 210 may be limited to about 25° by the stop 214 and the downward pivotal movement of the display 206 with respect to the horizontal sight line 210 may be limited to about 35° by the stop 215; another pair of opposed stops (not shown) are provided opposite the stops 214 and 215 on the opposite side of the front portion of the shell 200. By being pivoted upwardly and downwardly, the display 206 may be moved out of the horizontal sight line 210 of a person wearing the combination 10F to permit such person to use his natural eyesight to view a scene or object while wearing the combination 10F. When the display 206 is pivoted into the upward position shown in FIG. 19, the person wearing the combination 10F may move his eyes upwardly to see the visual display provided on the display 206 and thereby a visual image of a scene or object viewed by the infrared sensor camera 16 (FIG. 16) while the eyes of the person are free to be moved downwardly along the horizontal sight line 210 to use the person's natural eyesight to see a scene or object. Similarly, upon the display 206 being pivoted downwardly as indicated by the arrow 212 in FIG. 19, the person wearing the combination 10F may move his eyes downwardly and see the visual image provided on the display 206 from the scene viewed by the infrared sensor camera while the eyes of the person wearing the helmet are free to move upwardly to the horizontal sight line 210 to use the person's natural sight to view a scene or objects.

Referring again to FIG. 17, it will be understood that the housing 202 in which the infrared sensor camera 16 is housed and the housing 204 in which the combination signal processing and battery supply are housed may be suitably counterbalanced with respect to each other to apply equal forces or torque on the helmet 100 while being worn by a person. The weight of each housing and its housed elements may be counterbalanced with respect to the weight of the other housing by adding a suitable weight, or weights, to the lighter of the two housings to assure such counterbalance; a suitable counterbalance weight is indicated diagrammatically in FIG. 17 as being mounted in the housing 204, and such weight may be, for example, a body of lead or the like.

A still further alternate embodiment of the combination head-protective helmet and thermal imaging apparatus of the present invention is illustrated in FIGS. 20 and 21 and is indicated by general numerical designation 10G. In the preferred embodiment of combination 10G, the head-protective helmet is embodied as a fireman's helmet and is indicated by general numerical designation 12G; firefighter's helmet 12G may be the same as firefighter's helmet 12 shown in FIGS. 1 and 2 and described above. Helmet 12G includes a cap 13G and an outwardly and downwardly extending brim 14G formed integrally with the cap 13G. The helmet 12G may be made of a hard plastic such as a suitable high temperature thermoset which may be filled with glass or other fibers for increased strength. A non-resilient foam liner and a cradle of a plurality of web straps, not shown, may be suitably mounted to the interior of the helmet 12G and may be, for example, the non-resilient foam liner 26 and cradle 28 of a plurality of web straps 30 shown in FIGS. 2 and 4 of U.S. Pat. No. 5,044,014 incorporated hereinabove.

Combination 10G may include a housing 302 in which an infrared sensor camera 16, such as the infrared sensor camera 16 shown in FIGS. 1 and 2 and described above, is suitably mounted and a housing 304 in which combination signal processing and a battery supply, such as combination signal processing and battery supply 19 shown in FIG. 2, are suitably mounted. The housings 302 and 304 may be mounted to the helmet 12G by a generally U-shaped mounting member indicated by general numerical designation 305 in FIGS. 20 and 21. Mounting member 305 may include an integrally formed pair of generally elongated and outwardly curved mounting members 306 and 308 and an interconnecting member 309 interconnecting mounting members 306 and 308. As illustrated in FIG. 25 with regard to representative mounting member 306, the mounting members 306 and 308 are generally complementary in shape to the generally opposed forward portions of the brim 14G. The mounting member 305 may be made of a suitable hard plastic such as the above-noted suitable high temperature thermoset which, as also noted above, may be filled with glass or other fibers for increased strengths.

The mounting members 306 and 308, FIGS. 20 and 21, may be provided with suitable spring biased latches 310 and 312 and the opposed forward portions of the brim 14G, as indicated diagrammatically in FIG. 22, may be provided with outwardly extending loops such as representative loop 315 shown in FIG. 22. The loop 315 also may be made of a suitable hard plastic such as the above-noted suitable high temperature thermoset and may be suitably mounted or adhered to the helmet brim 14G such as by a suitable plastic of the type known to the art for bonding or adhering the plastic parts together. Representative latch 310 is illustrated diagrammatically in FIG. 22 and may include a reciprocally movable spring mounted latching member 316 including a latching element 317 for being latched under the loop 315. The latching member 316 is biased in the direction indicated by the arrow 318 by the compression spring 320 to cause the latching element 317 to remain latched under the loop 315 until the latching element 316 is manually moved in the direction of the arrow 322 to unlatch the latching element 317 from the loop 315. Accordingly, it will be understood that the mounting member 305, and thereby the thermal imaging apparatus (the housing 302 in which the infrared sensor camera 16 is mounted), the housing 304 in which the combination signal processing and battery supply are mounted, and the display 20), may be mounted removably to the helmet brim 14G.

The housings 302 and 304 also may be made of a suitable hard plastic such as a suitable high temperature thermoset and may be filled with glass or other fibers for increased strength. The housings 302 and 304 may be made in two parts by suitable molding techniques, such as for example injection molding, and suitably assembled by a suitable plastic adhesive. The inner portions of the housings 302 and 304 may be formed integrally with the mounting members 306 and 308 or the housings 302 and 304 made separately as described above and then suitably mounted to the mounting members 306 and 308 by a suitable plastic adhesive.

The forward portions of the mounting members 306 and 308 are provided with integrally formed respective forward portions 306A and 308A and a pair of parallel and spaced apart display mounting members 324 and 326, FIGS. 20 and 21, are disposed generally perpendicularly with regard to and suitably mounted to the respective forward portions 306A and 308A of the mounting members 306 and 308; the display mounting members are for mounting the display 20G for reciprocal vertical movement upwardly and downwardly as indicated by the double headed arrow 325 in FIG. 20. Upward movement of the display 20G moves the display 20G out of the horizontal sight line of the person wearing the combination 10G, such as the horizontal sight line 210 shown in FIG. 19 and described above, to permit the person wearing the combination to use their natural eyesight to view a scene or object. Upon the display 20G being moved downwardly into the viewing position shown in FIGS. 20 and 21, the person wearing the combination 10G views the visual image of the thermal image viewed by the infrared thermal sensor camera 16 as described above with regard to a combination 10 shown particularly in FIG. 1. As will be understood from FIG. 23 with respect to representative display mounting member 324, the display 20G and the display mounting members 324 and 326 may be slidably interconnected for reciprocal vertical sliding movement of the display 20G by a suitable dovetailed interconnection illustrated diagrammatically in FIG. 23. The display 20G and the mounting members 324 and 326 may be engaged in a slight interference engagement which permits the display 26 to remain into an upward position, or downward position, when moved into such position manually by a person wearing the combination 10G. The display mounting members 324 and 326 may be made of a suitable hard plastic such as the fiber filled thermoset described above and may be suitably mounted to the respective forward portions 306A and 308A of the mounting members 306 and 308 upon the mounting member 305 also being made of such fiber filled thermoset plastic. Alternatively, the mounting members 306 and 308, the interconnecting member 309, and the display mounting members 324 and 326, may be formed integrally such as by suitable injection molding.

It will be understood, as indicated diagrammatically in FIG. 24 with regard to housing 302, that the upper portion of the housing 330 may be hardened with respect to the other portions of the housing 302 to provide further protection to the infrared sensor camera 16 from falling objects. Upon the housing 302 being made of a suitable plastic as noted above, the upper portion of the housing 330 may be suitably hardened in the manner known to the art such as being exposed to UV radiation. It will be further understood that the infrared sensor camera 16, the combination signal processing and battery supply 10 (not shown) mounted in the housing 304 and the display 20G may be suitably interconnected electrically such as by the cables 17A, 17B and 17C shown in FIG. 2 or by other suitable electrical interconnecting means such as optical fibers and the like.

Figure 28:
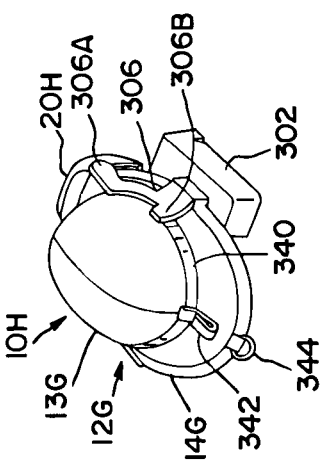
FIG. 28 is a right rear perspective view of the embodiment shown in FIG. 26.
Figure 29:
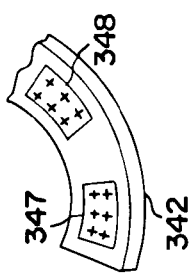
FIG. 29 is a partial view of a loop for assisting in mounting or attaching the thermal imaging and display apparatus shown in FIG. 26 to the head-protective helmet.
Figure 30:
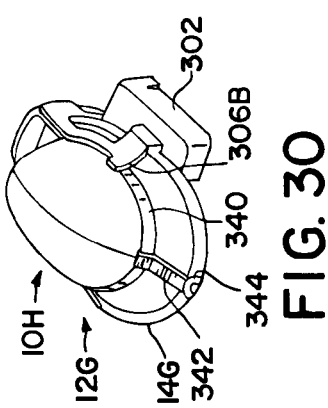
FIG. 30 is a right rear perspective view of the embodiment shown in FIG. 26 illustrating the manner in which the mounting loop shown in FIG. 29 performs its mounting function.

The alternate embodiment of the combination head-protective helmet and thermal imaging apparatus of the present invention illustrated in FIGS. 26–28 and 30 is indicated by general numerical designation 10H. The elements or components comprising combination 10H which perform the same function, or at least substantially the same function, as the elements comprising the combination 10G shown in FIGS. 20 and 21 and described above are given the same numerical designations in FIGS. 26–28 and 30, accordingly, a description of their structure and function will not be repeated. Combination 10H of FIGS. 26–28 and 30 differs from combination 10G of FIGS. 20 and 21, principally, by the manner in which the generally U-shaped mounting member 305, and thereby the mounting members 306 and 308, the housings 302 and 304 and display 20H, are mounted to the helmet 12G. In the embodiment of combination 10H shown in FIGS. 26–28 and 30, the mounting member 305, note particularly FIGS. 28 and 30, is mounted to the lower generally elongated circular forward portion of the helmet cap 13G by an elastic band or strap 340 made of suitable elastic material and a loop member 342 suitably connected, such as by stitching, to the elastic band or strap 340; the elastic band 340 is stretched over or around and elastically engages the rearward circular portion of the helmet cap 13G. As shown in FIGS. 28 and 30, the brim 14G of the helmet 12G is provided, typically, at its rearward portion with a pivotally mounted loop member or D-ring 344 typically used to hang the helmet 12G to a suitable support in a firehouse during non-use. The inner surface of the loop member 342, note FIG. 29, is provided with complementary hook and eye patches 347 and 348, and upon the loop member 342 being looped through the loop member or D-ring 344, the loop member 342 is folded back up on itself and the hook and eye patches 347 and 348 (FIG. 29) are engaged and to thereby further fasten the elastic band or strap 340 and thereby the mounting member 305 to the helmet brim 12G. By unfastening the hook and eye patches 347 and 348 from each other, the loop member 342 may be removed from the loop member or D-ring 344 and the elastic band or strap 340 may be stretched and removed from the cap 13G to remove the combination 10G from the helmet 12G.

Figure 31:
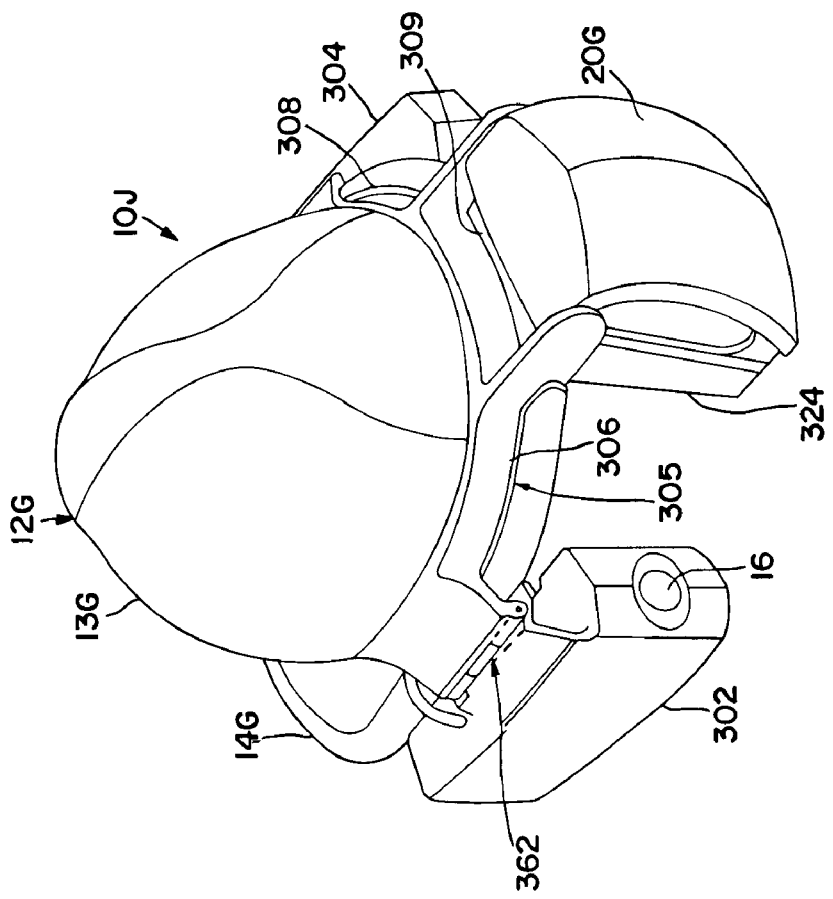
FIG. 31 is a left front perspective view of a still further embodiment of the present invention.
Figure 32:
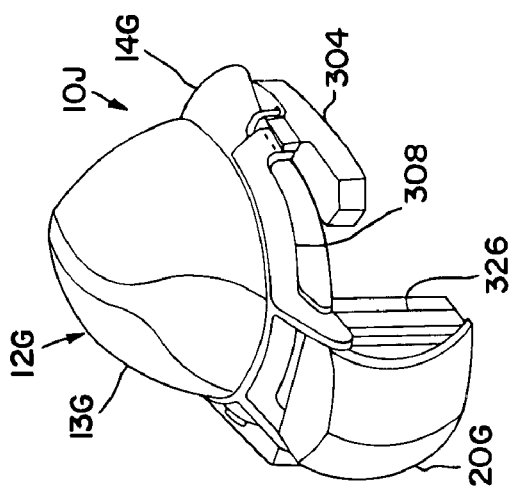
FIG. 32 is a right front perspective view of the embodiment shown in FIG. 31.
Figure 33:
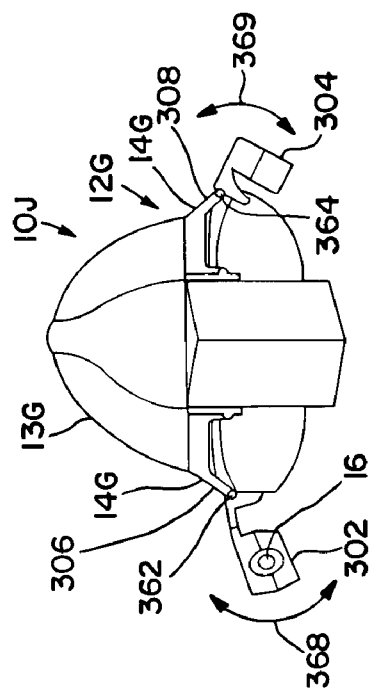
FIG. 33 is a front elevational view of the embodiment shown in FIGS. 31 and 32 and illustrating the mounting of the thermal imaging and display apparatus to the head-protective helmet.

Yet a further alternate embodiment of the combination head-protective helmet and thermal imaging apparatus of the present invention is illustrated in FIGS. 31–33 and indicated by general numerical designation 10J. Elements or components of combination 10I which perform the same function, or at least substantially the same function, as the corresponding elements or components comprising the combination 10G shown in FIGS. 20 and 21 are given the same numerical designations for convenience of reference. Combination 10J differs from combinations 10G and 10H principally by the manner in which the generally U-shaped mounting member 305 and thereby the mounting members 306 and 308, the housings 302 and 304 and the display 20G, are mounted to the helmet 12G, and mounted particularly to the generally opposed side portions of the helmet brim 14G. As will be best understood from FIG. 33, the housings 302 and 304 are mounted pivotally to the respective mounting members 306 and 308 by suitable spring-biased pivotal connections 362 and 364 for suitable pivotal movement as indicated by the respective double-headed arrows 368 and 369 shown in FIG. 33. Such spring-based pivotal connections 362 and 364 may be of the type known to the art and sometimes referred to in the art as over-the-center spring-biased pivotal connections which permit the housing members 302 and 304 to be pivoted manually upwardly and downwardly with respect to the mounting members 306 and 308, as indicated by the curved arrows 368 and 369, and to be maintained in their upward and downward positions due to such spring biasing interconnections. It will be understood that such spring-biased interconnections permit the housings 302 and 304 and mounting members 306 and 308 to function as clamps and to clamp and unclamp from the mounting member 305 from the generally opposed side portions of the helmet brim 14G to mount and remove the housings and mounting members and display from the helmet brim 14G.

It will be understood by those skilled in the art that many modifications and variations may be made in the present invention without departing from the spirit and the scope thereof.

What is claimed is:

1. Combination head-protective helmet and thermal imaging apparatus for being worn by a person in a heated environment where stratified heat is present which increases vertically, comprising:
   a head-protective helmet including a cap and a brim circumscribing said cap and extending downwardly and outwardly from cap sufficiently to provide an envelope of reduced heat under said brim upon said head-protective helmet being present in said stratified heat;
   thermal imaging apparatus including an infrared sensor camera for producing an infrared image of a scene or object and display apparatus which generates a visible image of said scene or object from said infrared image for viewing by the eyes of a person wearing said combination;
   first mounting means for mounting said camera to said head-protective helmet substantially underneath said brim to protect said camera from falling objects striking said helmet and to cause said camera to substantially reside in said envelope of reduced heat to reduce the influence of said heated environment on said camera, said first mounting means mounting said infrared sensor camera to said head-protective helmet to locate said infrared sensor to the side of the face of said person wearing said combination; and
   second mounting means for mounting said display apparatus to said helmet in a position to permit the eyes of said person to see said visible image
   Wherein said first mounting means mounting said camera for rotation in both the horizontal and vertical directions; and
   said display apparatus includes a television tube or LCD, signal processing means for receiving thermal image signals from said camera and for converting said thermal image signals to TV signals for transmission to said television tube to cause said television tube or LCD to produce a visible, television image of said scene or object carried by light rays emanating from said television tube, a pair of eyepieces and optical means through which said light rays are transmitted to said eyepieces, said optical means for converting said TV image to a pair of intermediate real images of said scene or object in advance of said pair of eyepieces, said pair of eyepieces for converting said pair of intermediate real images to a pair of virtual images of said scene or object for viewing by the eyes said person through said eyepieces.

2. The combination according to claim 1 wherein said helmet means includes a cap and a brim circumscribing said cap and extending downwardly and outwardly from said cap, said cap and said brim having an outer surface providing a protective plane against falling objects and said protective shield having an outer surface which extends said protective plane.

3. The combination according to claim 1 wherein said helmet means includes a cap and a brim circumscribing said cap and extending downwardly and outwardly from said cap, said cap and said brim having an outer surface providing a protective plane against falling objects and wherein said protective means comprise an integrally formed and outwardly and downwardly extending portion of said brim covering said camera and extending said plane of protection.

4. The combination according to claim 1 wherein said protective means comprise housing means and wherein said camera is mounted to said protective means by being mounted in said housing means.

5. The combination according to claim 4 wherein said helmet means comprise a generally semi-spherical shell having a generally elongated circular lower portion and an outer surface providing a first plane of protection against falling objects, and wherein said first mounting means are for mounting said housing means to said lower portion of said shell and wherein said housing means include an inclined upper surface adjacent said outer shell and providing a second plane of protection against falling objects, said second plane of protection extending said first plane of protection.

6. The combination according to claim 5 wherein said housing means comprise first housing means and wherein said combination further comprises second housing means and third mounting means for mounting said second housing means to said lower portion of said shell generally opposite said first housing means, said display means further comprising combination signal processing and battery supply means mounted in said second housing means and for receiving thermal image signals from said camera and for converting said thermal image signals into visual image signals and for transmitting said visual image signals to said display to produce said visible image.

7. The combination according to claim 6 wherein said person wearing said combination has a horizontal sight line and wherein said second mounting means are for mounting said visual display pivotally to said shell to permit said shell to be pivoted upwardly and downwardly with respect to said horizontal sight line.

8. The combination according to claim 7 wherein said shell is provided with a pair of pivot stops for limiting the upward pivotal movement of said visual display with respect to said horizontal sight line to about 25° and for limiting said downward pivotal movement of said visual display with respect to said horizontal sight line to about 35°.

9. The combination according to claim 1 wherein said first mounting means comprise a generally U-shaped mounting member and fastening means for fastening said mounting member to said helmet means.

10. The combination according to claim 9 wherein said helmet means includes a cap and a brim circumscribing said cap and extending outwardly and downwardly from said cap and including generally opposed brim forward portions, wherein said mounting member includes a pair of integrally formed outwardly extending and spaced apart mounting member portions and an interconnecting portion interconnecting said mounting member portions.

11. The combination according to claim 10 wherein said mounting member portions are generally complementary in shape to said brim forward portions and wherein said fastening means are for fastening said mounting member portions to said brim forward portions.

12. The combination according to claim 11 wherein said opposed brim portions are provided with a pair of outwardly extending loop portions and wherein said fastening means comprise a pair of spring biased latching members mounted on said mounting member portions and for latching onto said loops to fasten said mounting member portions and thereby said mounting member to said brim forward portions.

13. The combination according to claim 10 wherein said cap includes a generally circular cap forward portion and wherein said generally U-shaped mounting member is for generally encircling and engaging said cap forward portion, and wherein said fastening means comprise a pair of spring-biased pivoting means respectively interconnecting said mounting member portions and said first housing and said second housing to cause said mounting member portions and said first housing and said second housing to act as spring clamps to releasably clamp said mounting member to said brim.

14. The combination according to claim 10 wherein said cap includes a generally circular cap forward portion and a generally circular cap rearward portion, wherein said brim includes a rearward portion, wherein said helmet includes a ring member mounted pivotally to said brim rearward portion, wherein said mounting member portions include rearward portions, and wherein said fastening means comprise an elastic band or strap mounted to said rearward portions of said mounting member portions and for encircling and elastically engaging said brim rearward portion and a loop member fastened to said elastic band and for being looped through said ring member and fastened upon itself to further mount said mounting member to said helmet.

15. The combination according to claim 10 wherein said mounting member portions include forward portions and wherein said second mounting means comprise a pair of spaced apart and generally parallel display mounting members disposed generally perpendicularly with respect to and mounted to said forward portions of said mounting member portions and wherein said display mounting members are for mounting said display for reciprocal upwardly and downwardly vertical movement with respect to said display mounting members and thereby with respect to the face of a person wearing said combination.

16. Combination according to claim 1 wherein said combination further comprises elastic or adjustable straps mounted to said helmet and which straps mount said display apparatus to said helmet.

17. Combination according to claim 1 wherein said camera imparts torque to said helmet causing fatigue to the head of said person and wherein said combination further includes a counter balance mounted to said helmet substantially opposite said camera and substantially equal in weight to said camera and said counter balance imparting torque to said helmet substantially canceling said torque imparted by said camera and substantially eliminating said fatigue to said head of said person.

\* \* \* \* \*